UNITED STATES PATENT OFFICE.

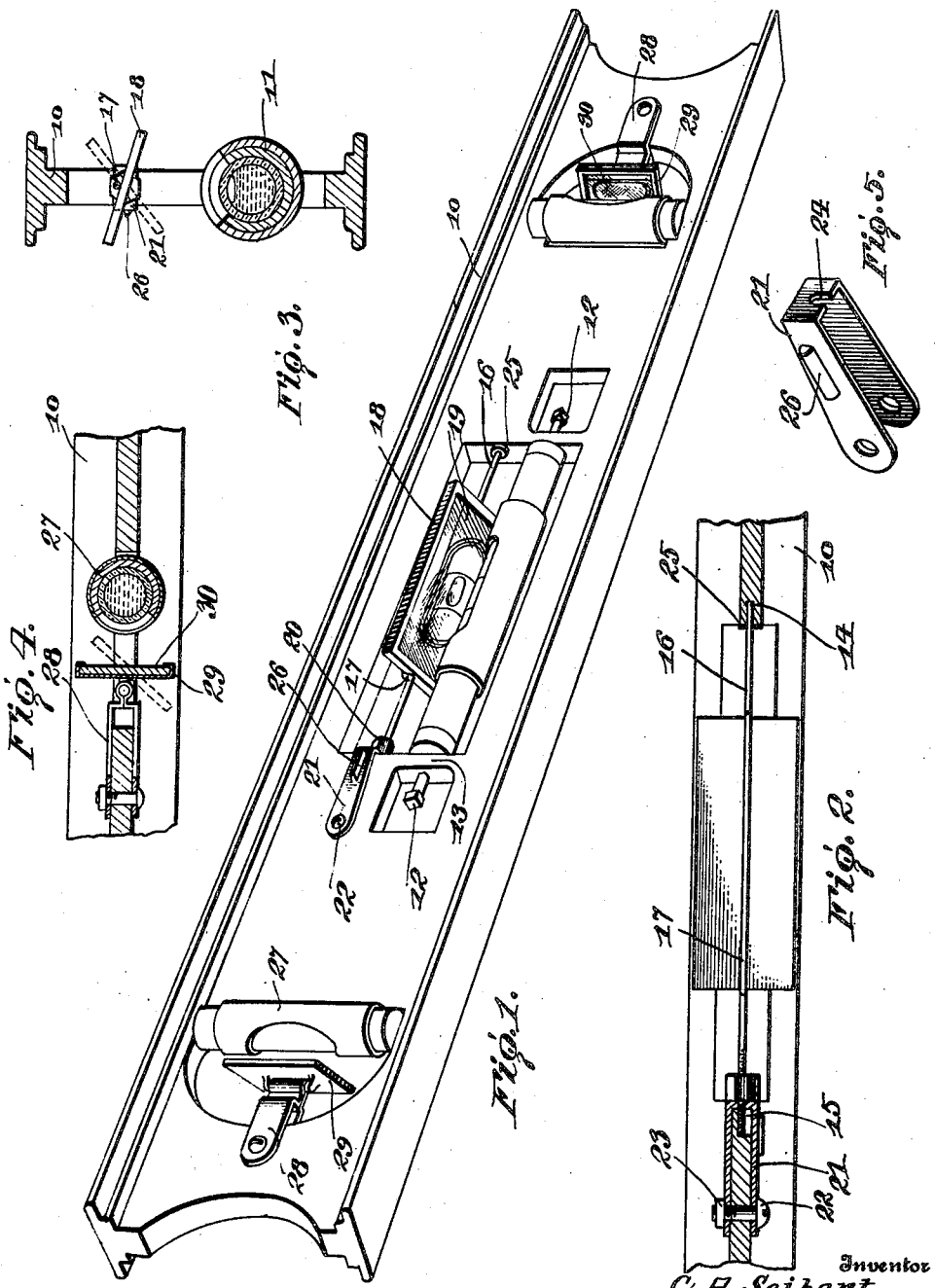

CHRISTOPHER A. SEIBERT, OF SANDYVILLE, OHIO.

MIRROR FOR SPIRIT-LEVELS.

934,698.

Specification of Letters Patent. Patented Sept. 21, 1909.

Application filed April 16, 1909. Serial No. 490,286.

*To all whom it may concern:*

Be it known that I, CHRISTOPHER A. SEIBERT, citizen of the United States, residing at Sandyville, in the county of Tuscarawas and State of Ohio, have invented certain new and useful Improvements in Mirrors for Spirit-Levels, of which the following is a specification.

This invention relates to spirit levels and refers particularly to an attachment to be applied to the same.

This invention has for an object the provision of an attachment for a spirit level whereby the readings may be taken on the level in positions where access to the spirit tube cannot be gained and where the air bubble within the tube cannot be observed.

The invention has for another object the provision of a mirror which is adjustably supported upon a level so that the mirror may be positioned in various angles in order to reflect the image of the air bubble from obscure places so that carpenters and the like will be enabled to observe the reading indicated.

The invention further provides a mirror which is detachably secured to the level and which may be reversed in position so as to enable the operator to remove the mirror when the same is not in use or to reverse the position of the same when it is desired to do so.

The invention still further contemplates the provision of a device of this character which comprises but few parts and which are of such formation as to produce a device which is strong and durable as well as one which is of a practical nature.

For a full understanding of the invention reference is to be had to the following description and accompanying drawings, in which:—

Figure 1 is a perspective view of the complete level having the improved mirror attachment applied to the same. Fig. 2 is a transverse longitudinal section through the central portion of the level disclosing the improved mirror applied thereto. Fig. 3 is a vertical central section through the level. Fig. 4 is a horizontal section through one end of the level disclosing the application of the mirror thereto, and Fig. 5 is a detailed perspective view of the bail employed in locking the mirror in position.

Corresponding and like parts are referred to in the following description and indicated in all the views of the drawings by the same reference characters.

Referring to the drawings the numeral 10 designates the body portion of the level which is of elongated formation having oppositely disposed sides which are in parallel relation and having the opposite edges thereof positioned in parallel so that readings may be taken of the device when in various positions. The body portion 10 is intermediately cut away or recessed to admit of the positioning of a spirit tube 11 which is of common construction and which is preferably detachably secured in position by means of set screws 12 carried through arms 13 intermediately formed in the body portion 10 adjacent the opening therein. The edges of the body portion 10 are terminated in oppositely disposed parallel faces one edge of which is provided with a bore 14, while the opposite edge is provided with a lateral recess 15 which is disposed in registered relation with the bore 14 and said recess and bore are adapted to rotatably support the opposite ends of a stem 16 which is disposed across the opening formed in the body portion 10. The stem 16 is provided intermediately with an offset portion 17 which is formed for the reception of a frame 18 which is of rectangular formation and in which is disposed a suitable mirror 19. The frame 18 is preferably secured upon the offset portion 17 of the stem 16 by soldering the same to the offset portion 17 as is disclosed in the drawings.

The means employed for locking the mirror 19 in various angles comprises a jam nut 20 which is positioned upon one extremity of the stem 16, said extremity of the stem 16 being threaded for the reception of the jam nut 20 and to permit of the impinging of the same against one of the inner edges of the body portion 10 adjacent the central opening therein. When the stem 16 is positioned within the body portion 10, one extremity of the same is engaged within the recess 15, and for the purpose of retaining that extremity of the stem a bail 21 is provided which is pivoted at one extremity to the sides of the body portion 10 by means of a bolt 22 disposed through the body portion 10 and retained in position by means of a clamping nut 23. The bail 21 is provided at its outer end with a notch 24 which is adapted to engage about the end of the stem 16 to retain the same in position and to admit of the free rotation of the same upon the releasing of the nut 20. The bail 21 when disposed in a locked position completely closes the open side of the recess 15 and thereby prevents the lateral displacement of the end of the stem 16 disposed therein. The opposite end of the stem 16 is provided with a boss 25 which is adapted for engagement against the inner edge of the body portion 10 to prevent the stem 16 from engaging within the entire length of the bore 14, thereby lessening the frictional contact between the same and also providing means for holding the stem 16 in alinement with the spirit tube 11. For the purpose of admitting of the raising of the bail 21 out of engagement with the stem 16 a rib 26 is positioned upon one side of the bail 21 which is engaged by the operator in swinging the bail 21 upwardly.

Upon the opposite ends of the body portion 10 spirit tubes are formed as at 27 which are positioned at right angles to the spirit tube 11 for the purpose of determining readings when the body portion 10 is disposed in an upright position. The body portion is cut away for the reception of each of the spirit tubes 27 and carries a forked member 28 which engages about the edge of the body portion adjacent the cut away portion and is looped centrally for the reception of a strap 29 carried upon the rear face of a mirror frame 30 for supporting a mirror adjacent each of the vertically disposed spirit tubes 27. The mirror frame 30 is loosely carried upon the end of the forked member 28 and is permitted free swinging motion in opposite directions thereon.

In operation when the level is positioned in inaccessible places so that the operator is not enabled to obtain a close position thereto and it is necessary to take a reading of the same the mirrors 19 and 30 are turned until the same are adjusted at the required angles to reflect the images of the air bubbles so that the operator is enabled to observe the exact location of the same. The mirrors 29 are also employed likewise and readings may be taken of the same by the turning of the mirror frames 30 about the straps 29 in the outer ends of the forked members 28 to enable the operator to observe the position of the air bubbles contained in the vertical spirit tubes.

Having thus described the invention what is claimed as new is:—

1. A device as specified comprising a body portion, a tube mounted intermediately in said body portion, said body portion being cut away for the reception of said tube, the inner edge of said body portion adjacent said cut away portion having a bore formed therein, the opposite edge of said body portion having a recess formed in the side thereof in registration with the bore, a stem engaged detachably at its opposite extremities in the bore and in the recess respectively, a mirror carried intermediately on said stem, a boss carried on one end of said stem for engagement against the edge of said body portion, a bail pivotally mounted on said body portion for engagement with said stem and to close said recess and a jam nut carried on one end of said stem to impinge against said bail to lock said stem against rotation.

2. The combination of a body portion, a spirit tube in said body portion, said body portion having a bore and a recess oppositely disposed above said spirit tube, a stem engaged at its ends in said recess and said bore, a mirror on said stem, a locking member carried by said body portion to close said recess and to engage said stem and a jam nut carried by said stem to impinge against said locking member to hold said stem in adjusted position.

3. In combination, a body portion, a spirit tube in said body portion, said body portion having a bore and a recess formed therein adjacent said tube, a stem engaged in the bore and recess, a bail pivoted on said body portion to engage over the recess and to straddle said stem to retain the same in position, a jam nut on said stem and a mirror on said stem adjacent said tube.

In testimony whereof I affix my signature in presence of two witnesses.

CHRISTOPHER A. SEIBERT. [L. S.]

Witnesses:
 JACOB KLEIN,
 T. W. WELKER.